Sept. 1, 1942.  D. B. FISK ET AL  2,294,741
REMOTE INDICATOR
Filed Dec. 3, 1941
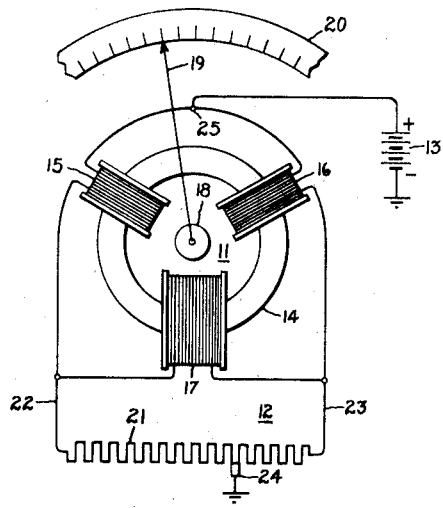
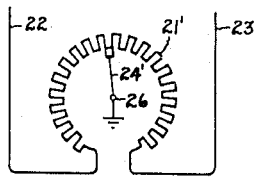
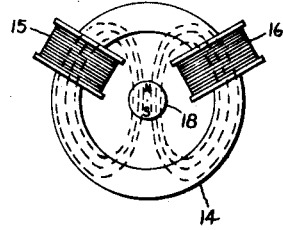
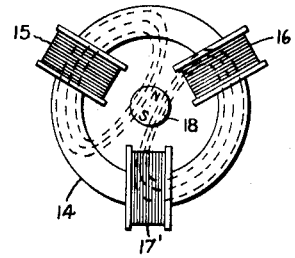
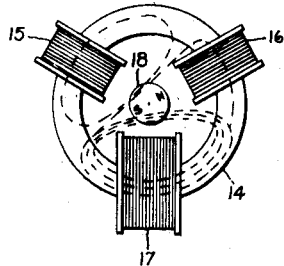
Inventors:
Daniels B. Fisk,
John R. Macintyre,
by Harry E. Dunham
Their Attorney.

Patented Sept. 1, 1942

2,294,741

UNITED STATES PATENT OFFICE 2,294,741

REMOTE INDICATOR

Daniels B. Fisk, Swampscott, and John R. Macintyre, South Peabody, Mass., assignors to General Electric Company, a corporation of New York Application December 3, 1941, Serial No. 421,446

2 Claims. (Cl. 177—351)

Our invention relates to electrical control systems and concerns particularly telemetering arrangements.

It is an object of our invention to provide improved arrangements for remote indication of positions of movable devices and for telemetering.

It is a further object of our invention to provide such a system with a receiver having a relatively long scale with only two conducting wires between the transmitter and the receiver, and with a single grounded brush at the transmitter.

Other and further advantages will become apparent as the description proceeds.

In carrying out our invention in its preferred form we provide a receiver in the form of an annular core carrying three current-conducting coils, one of which is larger than the other two, and having a transversely magnetized rotor cooperating with the magnetic flux produced in the annular core. A transmitter in the form of a resistor is connected across the largest current-conducting coil with a grounded brush moving along the resistor in response to variations in an indication to be transmitted and a current source is connected to the junction terminal of the remaining receiver coils on one side and is grounded on the other side.

A better understanding of our invention will be afforded by the following detailed description considered in connection with the accompanying drawing, and those features of the invention which are believed to be novel and patentable will be pointed out in the claims appended hereto.

In the drawing Fig. 1 is a schematic diagram of one embodiment of our invention; Fig. 2 is a diagram representing a modified form of transmitter which may be employed with the receiver shown in Fig. 1; and Figs. 3, 4 and 5 are flux diagrams illustrating the principle of operation of our invention. Like reference characters are used throughout the drawing to designate like parts.

The arrangement illustrated in Fig. 1 comprises a receiver 11, and a transmitter 12 energized by a current source 13, which has two terminals and is of the direct current type if a permanent magnet rotor type of receiver is employed, as illustrated. The receiver 11 may be similar in construction to the telemetering receiver or indicator shown in Patent No. 2,181,803 Faus. It comprises an annular core 14 composed of relatively permeable magnetic material, three current-conducting coils 15, 16 and 17 linking the core 14 and a transversely magnetized high coercive force cylindrical permanent magnet rotor 18. However, we employ different connections and a different form of transmitter from those illustrated in the aforesaid Faus patent and, for reasons which will be explained hereinafter, we find it advantageous to make one of the coils, for example, the receiver coil 17, of greater magnetic power than the other two. The rotor 18 may carry a suitable indicating device such as a pointer 19 cooperating with a graduated scale 20. The three receiver coils, 15, 16 and 17, are connected in series to form a continuous or closed current path as explained in the aforesaid Faus patent.

Our transmitter 12 comprises a resistor 21 connected across one of the receiver coils 17 by means of conductors 22 and 23 which are the only connecting wires needed between the transmitter 12 and the receiver 11. The transmitter 12 includes a slidable tap or brush 24 adapted to make electrical contact with different points along the resistor 21 in response to variations in a reading, indication or position to be transmitted to the receiver 11.

In the arrangement illustrated the rotor 18 is unidirectionally magnetized as a permanent magnet, and a direct current energizing source is employed. The current source 13 may take the form of a battery of cells having one terminal connected to the junction terminal 25 of the two receiver coils 15 and 16 and having the other battery terminal connected to a point at the same electrical potential as the transmitter brush 24. In practice both the second battery terminal and the transmitter brush 24 are grounded by connection to the framework of the machine or vehicle on which the telemetering system is employed. Customarily the positive terminal of the battery 13 is connected to the receiver terminal 25 and the negative terminal is grounded, but our invention is not limited to the specific arrangement described.

The manner in which the receiver responds to movement of the brush 24 along the transmitter resistor 21 may be understood from a consideration of Figs. 3 and 4. It is first assumed that the receiver coils are of the same electromagnetic dimensions and are mounted symmetrically around the axis of rotation of the rotor 18, that is, 120 degrees apart on the annular core 14 as represented by the coils 15, 16 and 17' in Fig. 4. By the same electromagnetic dimensions we mean producing the same magnetomotive force. This will be the case if the coils consist of the same number of turns of wire of the same size. In this case they will have the same resistances and, consequently, the same ampere turns for the same applied voltage.

If the transmitter brush 24 is set at the center of the resistor 21, the current will divide in coils 15 and 16, and no current will flow in the coil 17. The magnetomotive force of the coils 15 and 16 acts in opposition with respect to a circular flux path within the annular core 14. Consequently, as shown in Fig. 3, the fluxes produced by these two coils will be forced to leave the core 14 and follow a vertical diameter thereby aligning the rotor 18 with the north and south poles on a vertical line (considering the plane of the drawing to be vertical).

If the brush 24 is moved to the extreme left-hand end of the resistor 21 the coil 15 will be directly across the current source 13. Since the coils are 120 degrees apart, in the construction illustrated, the center of the coil 15 will be 60 degrees to the left of the vertical and the coil 15 considered alone will tend to produce a magnetic flux in the air space within the annular core 14 parallel to a diameter which tilts 30 degrees to the right of vertical, i. e., parallel to the axis of the coil 15.

Still assuming the coils 16 and 17' to be of the same size, the fluxes produced by these two coils will be along the same diameter as that produced by the coil 15 since the arrangement is symmetrical. A flux pattern such as illustrated in Fig. 4 will be obtained. Under these conditions the rotor 18 will tend to deflect to a position in which the north and south poles are along a line 30 degrees to the right of vertical. Movement of the brush 24 to the extreme right-hand end of the resistor 21 will produce a corresponding deflection to the left. It is evident, therefore, with the coils 15, 16 and 17' alike and arranged 120 degrees apart, a scale range of 60 degrees may be obtained.

For the purpose of increasing the length of the scale, we may increase the size of the coil 17' or its electro-magnetic power. This may be done, for example, by employing a greater number of turns in the coil 17 of Fig. 1 than in the coils 15 and 16, so that a current flowing in series through the coil 17 and one of the other coils will produce the greater magnetomotive force in the coil 17. In order to guard against diversion of current from the circuit of the coil 17 by the increase in resistance resulting from an increase in the number of turns we may utilize larger gage wire for winding the coil 17.

When the brush 24 is in the center the larger coil 17 will have no effect because both ends of the coil are at the same potential and no current flows through it. However, when the brush 24 is displaced in one direction or the other from the center, the effect of the increase in size of the coil 17 may be observed. For example, when the brush 24 is at the extreme left-hand end of the resistor 12, the coil 15 will be directly across the current source 13 as in the example previously explained, and the coil 17 will be in series with the coil 16, but the effect of the coil 17 will predominate over that of the coil 16. Consequently, the arrangement will no longer be symmetrical. The coil 17 considered alone will tend to produce a diametrical magnetic flux which is very nearly horizontal. If the strength of the coil 17 is substantially greater than that of the coils 15 and 16, as illustrated in Fig. 5, its effect will predominate sufficiently to cause the magnetic flux pattern to be similar to that illustrated in Fig. 5 in which the diametrical flux is tilted nearly 90 degrees to the right. The same effect may be observed when the brush 24 is moved to the extreme right-hand end of the resistor 21. A theoretical maximum scale would approach 180 degrees. However, in order to avoid making the relative size of the coil 17 excessive and in order to maintain sufficient torque over the entire indicator scale range, we consider it inadvisable to make the scale length approach 180 degrees. However, we have obtained good results with a proportion of turns which gives a scale length exceeding 90 degrees. We may augment the effect of increasing the size of the coil 17 by mounting the coils 15 and 16 closer together than 120 degrees.

In the arrangement of Fig. 1 the transmitter is shown by way of illustration as having a straight resistor 21 adapting it to the conversion of straight line motion of the brush 24 to angular indications of the receiver pointer 19. However, our invention is not limited to this specific arrangement and it may be utilized for transmitting angular movement directly. For example, as illustrated in Fig. 2, a resistor 21' may be employed which is arranged in the form of an arc of a circle, which may be any fraction or multiple of a complete circle, being changed to a helix, of course, if more than one turn is to be included. The brush 24' is rotatable and is carried by a shaft 26 which need not be insulated from ground nor from the brush 24'.

We have herein shown and particularly described certain embodiments of our invention and certain methods of operation embraced therein for the purpose of explaining its practice and showing its application, but it will be obvious to those skilled in the art that many modifications and variations are possible and we aim therefore to cover all such modifications and variations as fall within the scope of our invention which are defined in the appended claims.

What we claim as new and desire to secure by Letters Patent of the United States is:

1. A telemetering system comprising a receiver, a transmitter and a two-terminal current source, said receiver comprising three current-conducting coils arranged about a receiver axis, a rotor in inductive relation to said coils magnetized transversely to its axis of rotation and to the receiver axis, said coils being connected in series to form a continuous electrical path, one of said coils being of greater electromagnetic power than the other two coils, said transmitter comprising a resistor connected across the said more powerful coil and a brush movable along the resistor to make electrical contact with various points thereof in response to variations in an indication to be transmitted, the current source having one terminal connected to the junction terminal of the remaining two coils and the other terminal of the current source being connected to the transmitter brush.

2. A receiver for a telemetering system comprising a substantially annular core, three current-conducting coils linking it, one of said coils being of greater electromagnetic power than the other two and a rotor within the core magnetized transversely to its axis of rotation, said coils being connected in series to form a continuous electrical path and having a pair of terminals at the ends of the coil of greater power for connection to a transmitter and having a terminal at the junction of the remaining two coils for connection to a current source.

DANIELS B. FISK.
JOHN R. MACINTYRE.